(12) United States Patent
Hudson-Cloud

(10) Patent No.: US 12,214,756 B1
(45) Date of Patent: Feb. 4, 2025

(54) WINDSHIELD WIPER FLUID REFILLING SYSTEM

(71) Applicant: Rhonda Hudson-Cloud, Bedford Heights, OH (US)

(72) Inventor: Rhonda Hudson-Cloud, Bedford Heights, OH (US)

( * ) Notice: Subject to any disclaimer, the term of this patent is extended or adjusted under 35 U.S.C. 154(b) by 0 days.

(21) Appl. No.: 18/498,151

(22) Filed: Oct. 31, 2023

(51) Int. Cl.
*B60S 1/50* (2006.01)
*B60S 1/48* (2006.01)
*B67D 7/02* (2010.01)

(52) U.S. Cl.
CPC . *B60S 1/50* (2013.01); *B60S 1/48* (2013.01); *B67D 7/0288* (2013.01)

(58) Field of Classification Search
CPC .............. B60S 1/50; B60S 1/48; B60S 1/481
USPC ............... 15/250.01, 250.04; 239/284.1
See application file for complete search history.

(56) References Cited

U.S. PATENT DOCUMENTS

| | | | | |
|---|---|---|---|---|
| 2,941,728 | A * | 6/1960 | Paldanius | B60S 1/50 222/394 |
| 3,010,473 | A * | 11/1961 | McCurnin | B60S 1/522 15/250.04 |
| 3,213,493 | A * | 10/1965 | Chichester | B60S 1/50 248/231.71 |
| 3,253,786 | A * | 5/1966 | Parmelee | B60S 1/48 239/588 |
| 3,461,475 | A * | 8/1969 | Mathison | B60S 1/48 222/394 |
| 3,533,526 | A * | 10/1970 | Adell | B60S 1/50 215/10 |
| 5,118,040 | A * | 6/1992 | Abe | B60S 1/52 15/250.05 |
| 5,779,096 | A | 7/1998 | Cockfield | |
| D415,552 | S | 10/1999 | Malorni | |
| 8,671,977 | B2 | 3/2014 | Gonzales | |
| 9,725,074 | B2 | 8/2017 | Huebner | |
| 10,150,453 | B2 | 12/2018 | Busiello | |
| 10,315,838 | B1 | 6/2019 | Bishara | |
| 2020/0254978 | A1 | 8/2020 | Dilillo | |

FOREIGN PATENT DOCUMENTS

| | | | | |
|---|---|---|---|---|
| EP | 2236367 A1 | * | 10/2010 | ............... B60S 1/50 |
| EP | 3693234 | | 4/2022 | |
| GB | 754277 A | * | 8/1986 | |
| JP | 2007062479 A | * | 3/2007 | |

OTHER PUBLICATIONS

Machine translation of description portion of Japanese publication 2007-062479, published Mar. 2007. (Year: 2007).*

* cited by examiner

*Primary Examiner* — Gary K. Graham
(74) *Attorney, Agent, or Firm* — Kyle A. Fletcher, Esq.

(57) ABSTRACT

The windshield wiper fluid refilling system includes a vehicle and a reservoir cartridge. The vehicle further comprises a dashboard and a windshield cleaning apparatus. The reservoir cartridge is a cartridge based system that stores a cleaning solution. The reservoir cartridge forms a fluidic connection with the windshield cleaning apparatus. The reservoir cartridge feeds the cleaning solution into the windshield cleaning apparatus. The fluidic connection between the windshield cleaning apparatus and the reservoir cartridge is made in the dashboard of the vehicle.

11 Claims, 5 Drawing Sheets

WINDSHIELD WIPER FLUID REFILLING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The windshield wiper fluid refilling system comprises a vehicle and a reservoir cartridge. The vehicle further comprises a dashboard and a windshield cleaning apparatus. The reservoir cartridge is a cartridge based system that stores a cleaning solution. The reservoir cartridge forms a fluidic connection with the windshield cleaning apparatus. The reservoir cartridge feeds the cleaning solution into the windshield cleaning apparatus. The fluidic connection between the windshield cleaning apparatus and the reservoir cartridge is made in the dashboard of the vehicle.

SUMMARY OF INVENTION

The windshield wiper fluid refilling system comprises a vehicle and a reservoir cartridge. The vehicle further comprises a dashboard and a windshield cleaning apparatus. The reservoir cartridge is a cartridge based system that stores a cleaning solution. The reservoir cartridge forms a fluidic connection with the windshield cleaning apparatus. The reservoir cartridge feeds the cleaning solution into the windshield cleaning apparatus. The fluidic connection between the windshield cleaning apparatus and the reservoir cartridge is made in the dashboard of the vehicle.

These together with additional objects, features and advantages of the windshield wiper fluid refilling system will be readily apparent to those of ordinary skill in the art upon reading the following detailed description of the presently preferred, but nonetheless illustrative, embodiments when taken in conjunction with the accompanying drawings.

In this respect, before explaining the current embodiments of the windshield wiper fluid refilling system in detail, it is to be understood that the windshield wiper fluid refilling system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the windshield wiper fluid refilling system.

It is therefore important that the claims be regarded as including such equivalent construction insofar as they do not depart from the spirit and scope of the windshield wiper fluid refilling system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
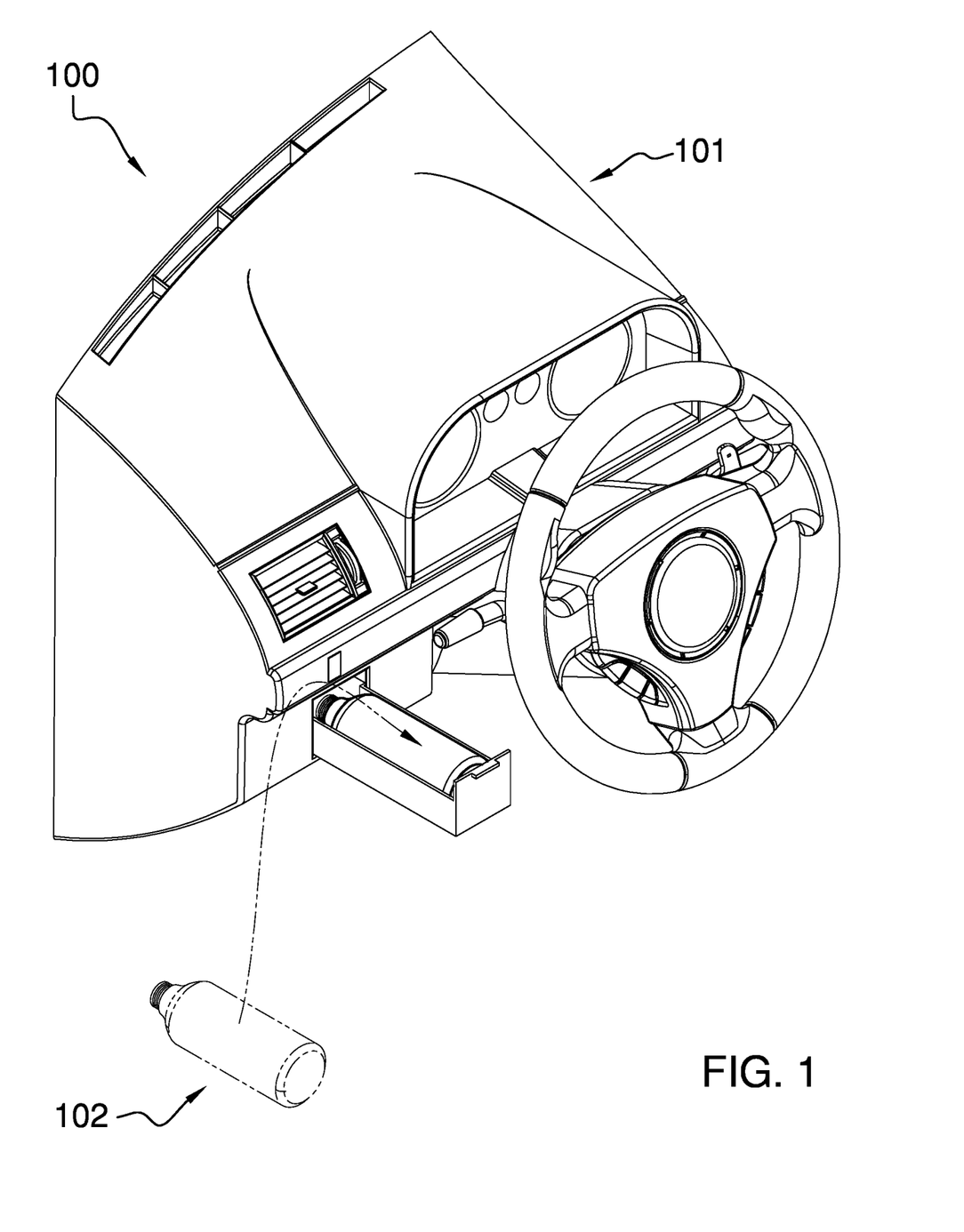
FIG. 1 is a perspective view of an embodiment of the disclosure.
Figure 2:
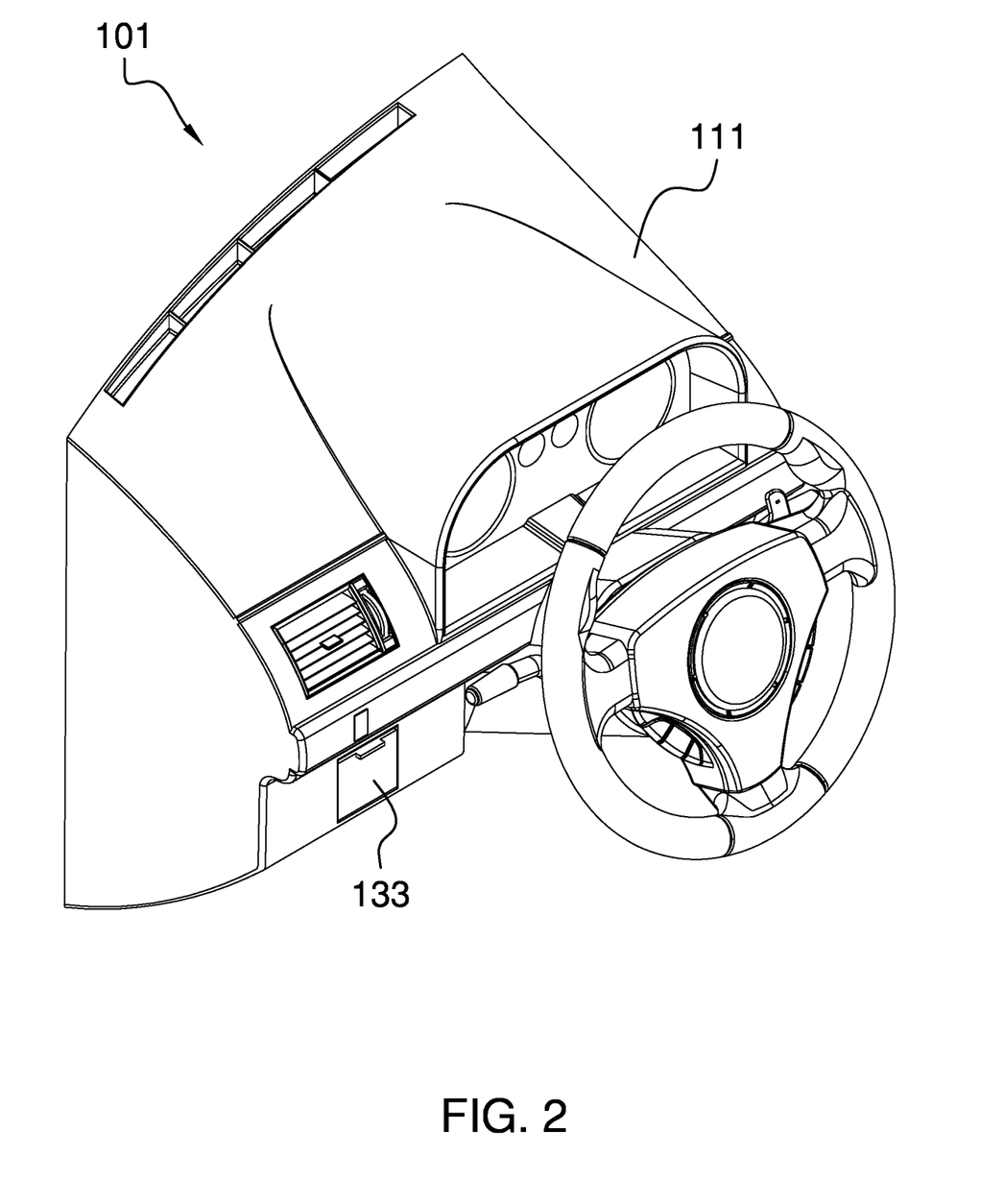
FIG. 2 is a perspective view of an embodiment of the disclosure.
Figure 3:
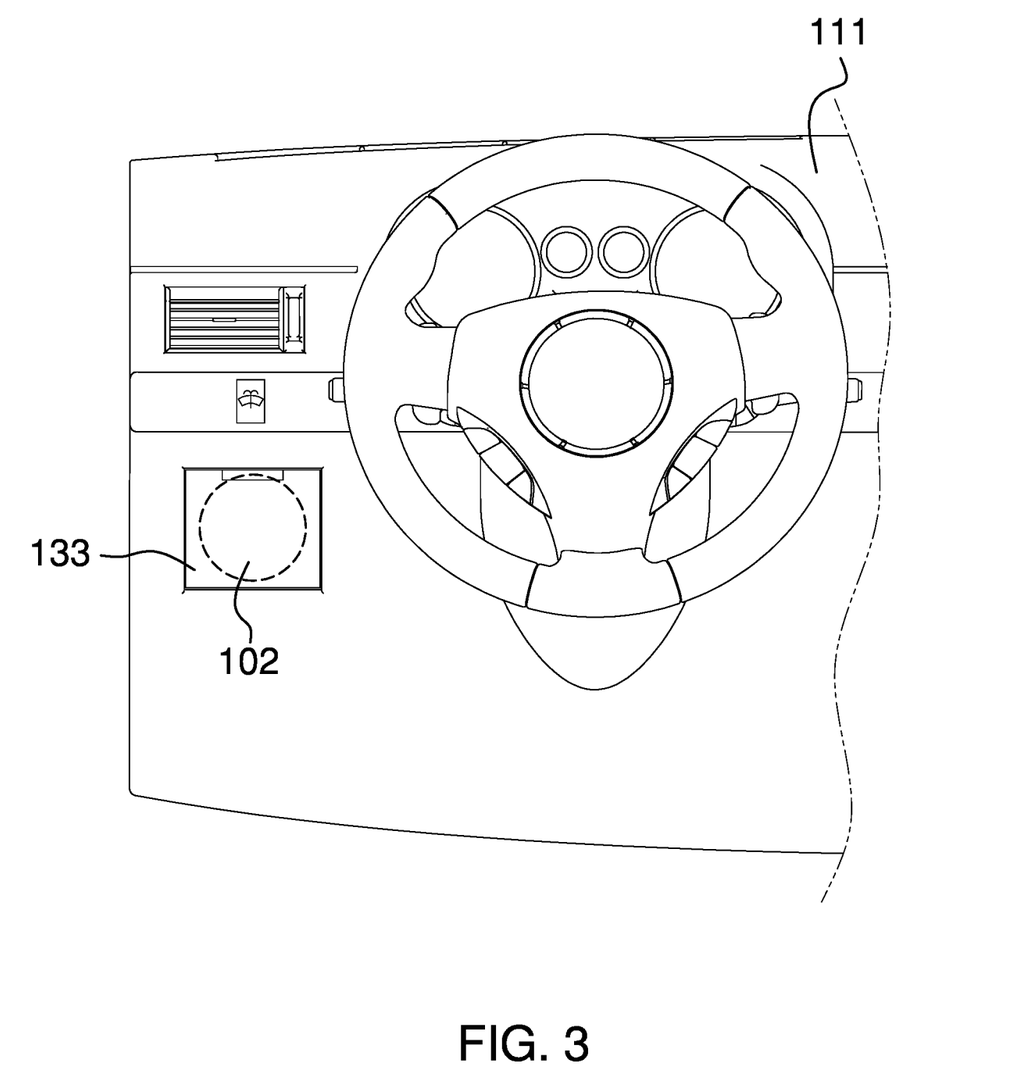
FIG. 3 is a front view of an embodiment of the disclosure.
Figure 4:
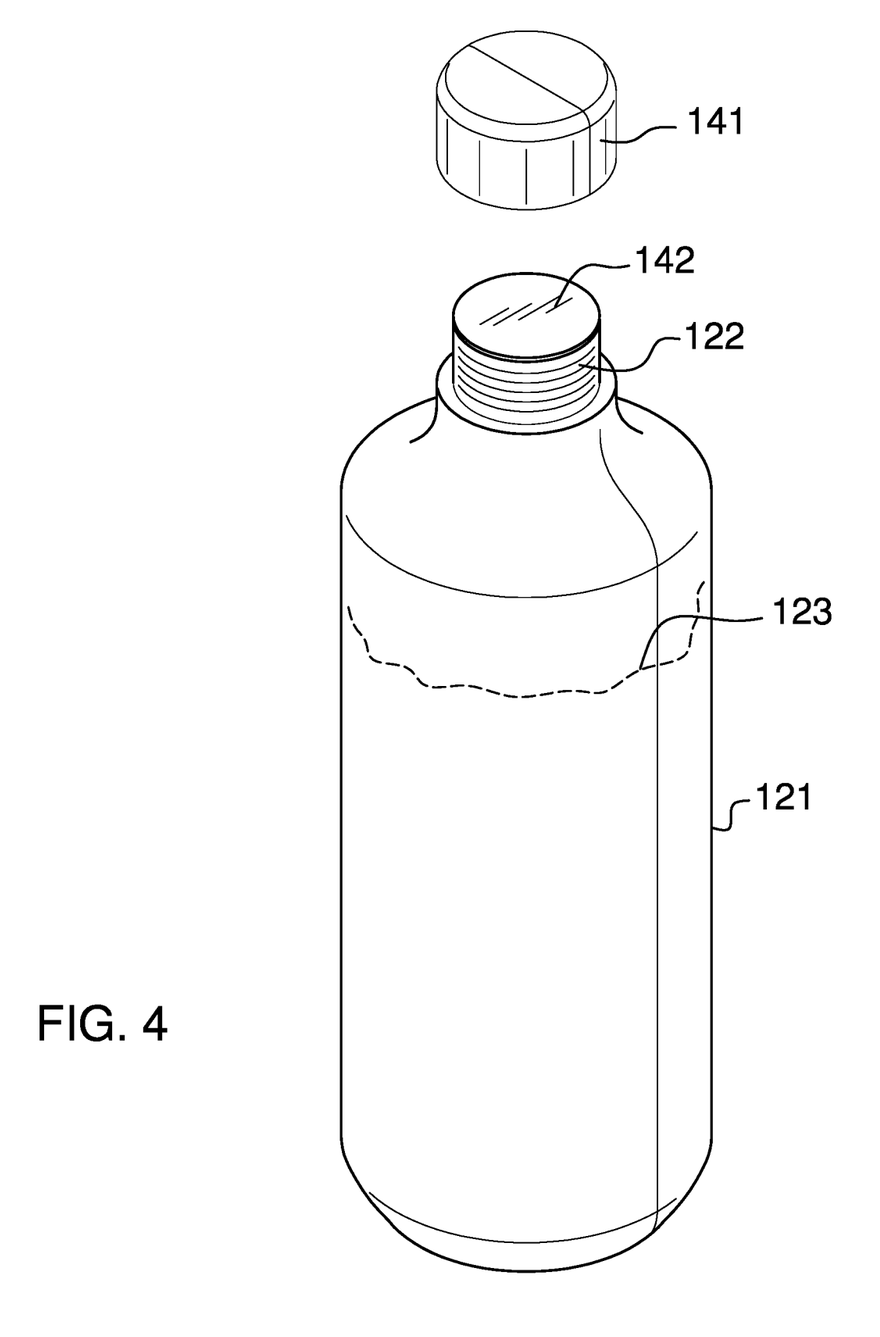
FIG. 4 is a detail view of an embodiment of the disclosure.
Figure 5:
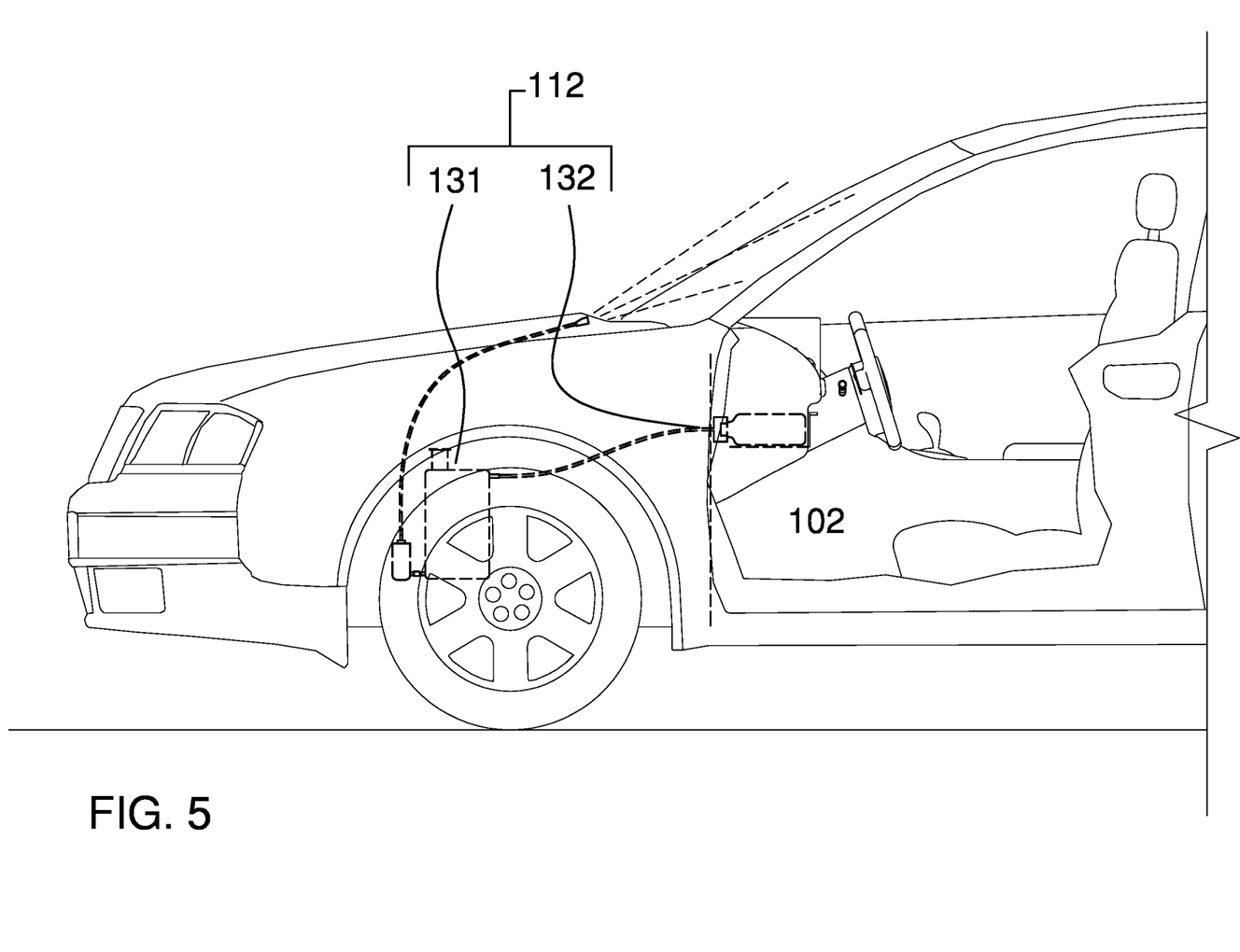
FIG. 5 is an in-use view of an embodiment of the disclosure.

Detailed reference will now be made to one or more potential embodiments of the disclosure, which are illustrated in FIGS. 1 through 5.

The windshield wiper fluid refilling system 100 (hereinafter invention) comprises a vehicle 101 and a reservoir cartridge 102. The vehicle 101 further comprises a dashboard 111 and a windshield cleaning apparatus 112. The reservoir cartridge 102 is a cartridge based system that stores a cleaning solution 123. The reservoir cartridge 102 forms a fluidic connection with the windshield cleaning apparatus 112. The reservoir cartridge 102 feeds the cleaning solution 123 into the windshield cleaning apparatus 112. The fluidic connection between the windshield cleaning apparatus 112 and the reservoir cartridge 102 is made in the dashboard 111 of the vehicle 101.

The vehicle 101 is a motorized vehicle. The vehicle 101 is used to transport passengers and cargo over a road network. The vehicle 101 comprises a dashboard 111 and a windshield cleaning apparatus 112.

The dashboard 111 is an instrument panel that is maintained in the cab of the vehicle 101. The dashboard 111 is accessible to the operator of the vehicle 101.

The windshield cleaning apparatus 112 is a mechanical device. The windshield cleaning apparatus 112 is configured for use with the windshield of the vehicle 101. The windshield cleaning apparatus 112 receives the cleaning solution 123 from the reservoir cartridge 102. The windshield cleaning apparatus discharges the cleaning solution 123 on to the windshield. The windshield cleaning apparatus 112 wipes the discharged cleaning solution 123 off of the windshield. The windshield cleaning apparatus 112 comprises a ws washing system 131, a ws fitting 132, and a ws tray 133.

The ws washing system 131 forms a fluidic connection with the ws fitting 132. The ws washing system 131 draws the cleaning fluid from the cleaning solution 123 out of the reservoir cartridge 102 into the ws washing system 131. The ws washing system 131 pumps the drawn cleaning solution 123 to the windshield. The ws washing system 131 discharges the cleaning solution 123 on to the windshield. The ws washing system 131 wipes the discharged cleaning solution 123 from the windshield.

The ws fitting 132 is a mechanical structure. The ws fitting 132 forms the fitting of the reservoir cartridge 102 that attaches to the neck structure 122 of the reservoir cartridge 102. The ws fitting 132 draws the cleaning solution from the reservoir cartridge 102 through the ws fitting 132. The ws fitting 132 forms a fluid impermeable seal with the neck structure 122.

The ws tray 133 is a drawer that is formed in the dashboard of the vehicle 101. The ws tray 133 is sized such that the reservoir cartridge 102 inserts into the ws tray 133. The ws tray 133 slides into and out of the dashboard 111. The ws tray provides the physical access required between the reservoir cartridge 102 and the ws washing system 131. The ws tray 133 positions the reservoir cartridge 102 within in the ws tray 133 such that the neck structure 122 and the ws fitting 132 forms the fluid impermeable fluidic connection when the ws tray 133 slides into the dashboard 111.

The reservoir cartridge 102 forms a reservoir. The reservoir cartridge 102 stores the cleaning solution 123. The reservoir cartridge 102 forms a fluidic connection with the windshield cleaning apparatus 112. The reservoir cartridge 102 provides the windshield cleaning apparatus 112 with the cleaning solution 123. The reservoir cartridge 102 and the windshield cleaning apparatus 112 combine to form an enclosed system. By enclosed system is meant that the fluidic connection between reservoir cartridge 102 and the windshield cleaning apparatus combine to form a protection space that fully encloses the cleaning solution 123 within the enclosed system until the cleaning solution 123 is discharged from the windshield cleaning apparatus 112 on to a windshield.

The reservoir cartridge 102 has the structure of a bottle. The reservoir cartridge 102 comprises a flask structure 121, a neck structure 122, and the cleaning solution 123.

The flask structure 121 forms the containment structure of the reservoir cartridge 102. The flask structure 121 is a pan shaped structure. The flask structure 121 forms the physical space that contains the cleaning solution 123. The neck structure 122 encloses the open face of the pan structure of the flask structure 121.

The neck structure 122 is a fitting. The neck structure 122 forms a fluidic connection with the ws washing system 131 of the windshield cleaning apparatus 112. The neck structure 122 forms a fluid impermeable seal with the ws washing system 131. The neck structure 122 forms a flow path that transfers the cleaning solution 123 contained in the flask structure 121 to the ws washing system 131. The neck structure 122 further comprises a cap structure 141 and a fitting seal 142.

The cap structure 141 is a bottle cap. The cap structure forms a fluid impermeable seal between the neck structure 122 and the environment. The cap structure 141 encloses the cleaning solution 123 within the flask structure 121. The cap structure 141 is removed from the neck structure 122 before the reservoir cartridge 102 inserts into the ws tray 133.

The fitting seal 142 forms the fluidic connection with the ws fitting 132 of the windshield cleaning apparatus 112. The fitting seal 142 is designed to: a) contain the cleaning solution 123 within the flask structure 121 until the fluidic connection with the ws fitting 132 is formed; and, b) release the cleaning solution 123 into the ws fitting 132 after the fluidic connection is formed.

The cleaning solution 123 is a liquid phase compound. The cleaning solution 123 transports a cleaning agent through the ws washing system 131 to the windshield. The ws washing system 131 forms the mechanical structure of the windshield cleaning apparatus 112.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Bottle: As used in this disclosure, a bottle is a container used for the storage of fluids. A bottle generally comprises a flask and a neck. The flask is a pan shaped containment structure. The neck is a tubular structure that provides access to the interior of the flask. The neck comprises: a) a tube structure that forms an aperture through which fluids can be introduced and removed from the bottle; and, b) a physical structure that encloses the open face of the pan structure of the flask such that the inner dimension of the neck need not be identical to the inner dimension of the flask.

Bottle Cap: As used in this disclosure, a bottle cap refers to a lid that is used to enclose the open neck of a bottle. A disposable bottle cap refers to a bottle cap that must be pried off of the neck of the bottle. A reusable bottle cap refers to a bottle cap that attaches to the neck of the bottle using a threaded connection.

Boundary Structure: As used in this disclosure, a boundary structure is a barrier that separates a first object from a second object such that the second object cannot damage the first object.

Cant: As used in this disclosure, a cant is an angular deviation from one or more reference lines (or planes) such as a vertical line (or plane) or a horizontal line (or plane).

Cartridge: As used in this disclosure, a cartridge is a device used to contain an object or material in a manner suitable for use by a mechanical device. A cartridge will removably insert into the mechanical device such that the mechanical device can use the object or material as part of the process performed by the mechanical device. The cartridge is removed from the mechanical device once the object or material has been consumed.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Cleaning Agent: As used in this disclosure, a cleaning agent is a chemical compound used to remove pathogens, dirt and detritus from a surface.

Cleaning Solution: As used in this disclosure, a cleaning solution is a chemical solution that contains a solvent used to dissolve a cleaning agent.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Correspond: As used in this disclosure, the term correspond is used as a comparison between two or more objects wherein one or more properties shared by the two or more objects match, agree, or align within acceptable manufacturing tolerances.

Dashboard: As used in this disclosure, a dashboard is a mechanical structure that mounts underneath the front windshield of a motorized vehicle. The dashboard contains operating controls and instrumentation of the motorized vehicle are mounted in the dashboard. A dashboard is also referred to as a console.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drawer: As used in this disclosure, a drawer is a pan shaped structure that is designed to slide into and out of a larger object. The pan shaped structure is referred to as the drawer pan. The negative space the drawer pan slides into and out of is referred to as the drawer box.

Exterior: As used in this disclosure, the exterior is used as a relational term that implies that an object is not contained within the boundary of a structure or a space.

Fitting: As used in this disclosure, a fitting is a component that attaches a first object to a second object. The fitting is used to form a fluidic connection between the first object and the second object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Circuit: As used in this disclosure, a fluidic circuit is a closed loop path through which a fluid flows. The closed loop will generally initiate and terminate at reservoir.

Fluidic Connection: As used in this disclosure, a fluidic connection refers to a tubular structure that transports a fluid from a first object to a second object.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Protection Space: As used in this disclosure, a protection space is a space formed by a boundary structure. The boundary structure forms a protective barrier that protects objects outside the protection space from potential dangers from the operation of a device or process contained within the protection space.

Seal: As used in this disclosure, a seal is a structure that forms a fluid impermeable barrier between two objects.

Solid: As used in this disclosure, a solid refers to a state (phase) of matter that: 1) has a fixed volume; and, 2) does not flow.

Tray: As used in this disclosure, a tray is a disk structure roughly shaped with a pan structure.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Windshield: As used in this disclosure, a windshield refers to the front and rear window of a vehicle that is intended to shield the occupants of the vehicle from the wind generated by the normal motion of the vehicle. Windscreen is a synonym for windshield.

Wipe: As used in this disclosure, the verb wipe refers to rubbing a surface with an object. When a sheeting is used as the object wiping the surface, the sheeting is often referred to as a "wipe."

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A windshield wiper fluid refilling system comprising a vehicle and a reservoir cartridge;
wherein the reservoir cartridge mounts in the vehicle;
wherein the vehicle further comprises a dashboard and a windshield cleaning apparatus;
wherein the windshield cleaning apparatus is for use with a windshield of the vehicle;
wherein the reservoir cartridge is a cartridge based system that stores a cleaning solution;
wherein a fluidic connection between the windshield cleaning apparatus and the reservoir cartridge is made in the dashboard of the vehicle such that the reservoir cartridge is replaced from within a cab of the vehicle;
wherein the windshield cleaning apparatus comprises a windshield washing system (ws washing system), a windshield fitting (ws fitting), and a windshield tray (ws tray);
wherein the ws tray is a drawer that is formed in the dashboard of the vehicle;
wherein the ws tray is sized such that the reservoir cartridge inserts into the ws tray.

2. The windshield wiper fluid refilling system according to claim 1 wherein the dashboard is an instrument panel that is maintained in the cab of the vehicle;
wherein the dashboard is accessible to an operator of the vehicle;
wherein the windshield cleaning apparatus is a mechanical device;
wherein the windshield cleaning apparatus receives the cleaning solution from the reservoir cartridge;
wherein the windshield cleaning apparatus discharges the cleaning solution on to the windshield.

3. The windshield wiper fluid refilling system according to claim 2
wherein the reservoir cartridge forms the fluidic connection with the windshield cleaning apparatus;
wherein the reservoir cartridge feeds the cleaning solution into the windshield cleaning apparatus.

4. The windshield wiper fluid refilling system according to claim 3 wherein the reservoir cartridge and the windshield cleaning apparatus combine to form an enclosed system;
wherein by enclosed system is meant that the fluidic connection between reservoir cartridge and the windshield cleaning apparatus combine to form a protection space that fully encloses the cleaning solution within the enclosed system until the cleaning solution is discharged from the windshield cleaning apparatus on to the windshield.

5. The windshield wiper fluid refilling system according to claim 4
wherein the ws washing system forms a fluidic connection with the ws fitting;
wherein the reservoir cartridge mounts in the ws fitting.

6. The windshield wiper fluid refilling system according to claim 5
wherein the ws washing system pumps the cleaning fluid from the reservoir cartridge into the ws washing system;
wherein the ws washing system discharges the cleaning solution on to the windshield.

7. The windshield wiper fluid refilling system according to claim 6
wherein the ws fitting forms the fitting of the reservoir cartridge that attaches to a neck structure of the reservoir cartridge;
wherein the ws fitting draws the cleaning solution from the reservoir cartridge through the ws fitting;
wherein the ws fitting forms a fluid impermeable seal with the reservoir cartridge.

8. The windshield wiper fluid refilling system according to claim 7
wherein the ws tray slides into and out of the dashboard;
wherein the ws tray provides a physical access required between the reservoir cartridge and the ws washing system.

9. The windshield wiper fluid refilling system according to claim 8 wherein the ws tray positions the reservoir cartridge within in the ws tray such that the neck structure and the ws fitting forms the fluid impermeable fluidic connection when the ws tray slides into the dashboard.

10. The windshield wiper fluid refilling system according to claim 9
wherein the reservoir cartridge has a structure of a bottle;
wherein the reservoir cartridge comprises a flask structure, the neck structure, and the cleaning solution;
wherein the flask structure forms the containment structure of the reservoir cartridge;
wherein the flask structure is a pan shaped structure;
wherein the flask structure forms the physical space that contains the cleaning solution;
wherein the neck structure encloses an open face of the pan structure of the flask structure;
wherein the neck structure is a fitting;
wherein the neck structure forms a fluidic connection with the ws washing system of the windshield cleaning apparatus;
wherein the neck structure forms a fluid impermeable seal with the ws washing system;
wherein the neck structure forms a flow path that transfers the cleaning solution contained in the flask structure to the ws washing system.

11. The windshield wiper fluid refilling system according to claim 10
wherein the neck structure further comprises a cap structure and a fitting seal;
wherein the cap structure is a bottle cap;
wherein the cap structure forms a fluid impermeable seal between the neck structure and an environment;
wherein the cap structure encloses the cleaning solution within the flask structure;
wherein the cap structure is removed from the neck structure before the reservoir cartridge inserts into the ws tray;
wherein the fitting seal forms the fluidic connection with the ws fitting of the windshield cleaning apparatus;
wherein the fitting seal is designed to: a) contain the cleaning solution within the flask structure until the fluidic connection with the ws fitting is formed; and, b) release the cleaning solution into the ws fitting after the fluidic connection is formed;
wherein the cleaning solution is a liquid phase compound;
wherein the cleaning solution transports a cleaning agent through the ws washing system to the windshield.

* * * * *